United States Patent [19]
Kempf et al.

[11] Patent Number: 5,865,444
[45] Date of Patent: Feb. 2, 1999

[54] BODY LEVELING SUSPENSION INCLUDING A PIVOTING ARRANGEMENT

[75] Inventors: Bernd Kempf, Althornbach; Heinrich Scheid, Blieskastel; Wolfgang H. Roth, Zweibrucken; Klaus Pauli, Homburg-Einod; Wolfgang VonMeltzing, Bierbach, all of Germany

[73] Assignee: Deere & Company, Moline, Ill.

[21] Appl. No.: 943,063

[22] Filed: Oct. 2, 1997

Related U.S. Application Data

[63] Continuation of Ser. No. 588,696, Jan. 19, 1996, abandoned, which is a continuation of Ser. No. 218,444, filed as PCT/WO93/05640 Apr. 1, 1993, abandoned.

[51] Int. Cl.⁶ .......................................... B60S 9/00
[52] U.S. Cl. ..................... 280/6.154; 180/41; 180/905
[58] Field of Search .................... 280/702, 704, 280/709, 840, 6.1, 6.12, 43, 43.17, 6.154; 180/344, 348, 349, 357, 905, 906, 41

[56] References Cited

U.S. PATENT DOCUMENTS

| | | | |
|---|---|---|---|
| 1,386,123 | 8/1921 | Lewis ................................. | 180/41 |
| 2,753,675 | 7/1956 | Harp . | |
| 2,759,550 | 8/1956 | Moorehead .......................... | 180/41 |
| 2,904,341 | 9/1959 | Heitshu . | |
| 3,233,909 | 2/1966 | Boone ................................. | 280/6.12 |
| 3,666,036 | 5/1972 | Scerbo ................................ | 180/41 |
| 3,712,635 | 1/1973 | Weakly ............................... | 280/6.12 |
| 3,731,470 | 5/1973 | Cornish et al. .................... | 280/6.12 |
| 4,033,423 | 7/1977 | Grosseau ............................ | 280/6.12 |
| 4,054,295 | 10/1977 | Elliot ................................. | 280/707 |
| 4,157,125 | 6/1979 | Bushell et al. .................... | 180/41 |
| 4,162,083 | 7/1979 | Zabler et al. ...................... | 280/6.12 |
| 4,750,751 | 6/1988 | Schafer .............................. | 280/6.12 |
| 4,999,777 | 3/1991 | Schussler et al. ................. | 280/707 |

FOREIGN PATENT DOCUMENTS

| | | |
|---|---|---|
| 1089958 | 3/1955 | France ................................ 280/43.17 |
| 1136449 | 5/1957 | France . |
| 1066878 | 10/1959 | Germany . |
| 485725 | 10/1953 | Italy ................................... 180/41 |
| 1017575 | 5/1983 | U.S.S.R. . |
| 336029 | 10/1930 | United Kingdom . |
| 92/02121 | 9/1992 | WIPO . |

OTHER PUBLICATIONS

Service Manual, The Henschen CMA Effective Date Jul. 1, 1986, Henschen Industrial.
Brochure: Landtechnik, Bd. 34, Nr. 6, Jun. 1979, Lehrte, Hannover.

*Primary Examiner*—Paul N. Dickson

[57] ABSTRACT

A vehicle (10) intended for operation on level ground is equipped with a chassis (22) and a wheel carrier (50) on which a wheel (12) is supported. In order to operate the vehicle (10) on an incline, a pivoting arrangement (44) is inserted between the wheel carrier (50) and the chassis (22). The pivoting arrangement comprises a mount (52), a pivot arm (54) mounted therein and an actuating arrangement (56) to move the pivot arm (54). The attachment points on the chassis (22) or on a support (46) spaced at a distance thereto and on the wheel carrier (50) are configured in such a way that the wheel carrier (50) can be directly attached to the chassis (22) or to the pivoting arrangement (44).

7 Claims, 10 Drawing Sheets

BODY LEVELING SUSPENSION INCLUDING A PIVOTING ARRANGEMENT

This application is a Continuation of application Ser. No. 08/588,696 filed 19 Jan. 1996 which is a Continuation of application Ser. No. 08/218,444, filed as PCT/WO93/05640, Apr. 1, 1993, both abandoned.

BACKGROUND OF THE INVENTION

1. Field of the Invention

The invention is directed to a leveling suspension system that is provided with a pivoting arrangement which is particularly useful on an agricultural combine.

2. Description of the Prior Art

Vehicles are primarily designed to operate on level ground. Accordingly operation in hilly terrain, in which the support surface is oriented more or less at an incline, may lead to reduction in the performance of the machine. In the case of a combine designed for operation on level ground, a support arrangement is conventionally provided that contains a frame configured as an axle housing whose end is provided with a flange that is used to connect it to a mating flange on a final drive housing. If this configuration is retained, operation on an incline must either accept losses to the grain crop or groups of operating components in the combine must be designed so that they can compensate for the inclined operation.

On the other hand, suspension arrangements have already been proposed by means of which a machine operating on a hillside or on other inclined surfaces can be brought into a horizontal position.

Thus U.S. Pat. No. 3,731,470 discloses a combine with final drives each of which is attached to a pivot arm and supported in bearings in a mount fastened to a frame. The pivot arms are pivoted by means of a hydraulic cylinder about a horizontal axis that is concentric to a leg of the pivot arm configured as a sleeve. The final drive is pivoted with the pivot arm in a vertical plane and consequently adjusts the height or the inclination of the combine in response to signals determined by an inclination sensor. In addition a chain drive is provided in the pivot arm that transmits the power from a gearbox to the final drive.

This pivoting arrangement has the disadvantage that the pivot arm must contain a gear drive that transmits power from the power supply to the final drive and that considerably increases the overall width of the combine.

It is further known from U.S. Pat. No. 3,703,298 and Prospectus: Laverda mietitrebbia autolivellante M 100 AL, Ditta Pietro Laverda 1.ª edizione 1971-FOZ to pivot the entire axle body of a combine in a plane transverse to the direction of travel and to transmit power by means of shafts with universal joints.

The cost of equipping a vehicle with a pivoting arrangement of this type is very high.

German Patent-1 066 878 and 808 183 each show the suspension of a wheel of a drive axle of an agricultural tractor, where the wheel can be pivoted in a vertical plane and furthermore can be fixed in a particular position. By virtue of this arrangement the agricultural tractor can be operated on a road with a low center of gravity and in the field with a high center of gravity position, which helps to avoid damage to field crops by the agricultural tractor.

Furthermore it is known practice with agricultural tractors as well as other vehicles, in particular utility vehicles, to connect wheels, not adjustable in height, but directly or through a retainer that is usually configured as final drive. This type of machine includes every sort of vehicle, such as agricultural machines, construction vehicles, logging vehicles, off-the-road vehicles and the like.

SUMMARY

The problem underlying the invention is seen as that of proposing a solution that makes it possible to modify a vehicle for operation on a hillside or on an inclined surface as well as on a level surface with relatively few and simple means.

In this way a pivoting arrangement can be inserted between the wheel and the chassis without requiring any modification of these components.

Unlike the current state of the art, this solution does not require a full floating axle or the like, but the existing support and/or the existing chassis are retained, and in place of a direct connection with the wheel carrier, a mount with a pivot arm is now inserted, that makes the pivoting possible. The wheel carrier as well as the chassis and the power supply are identical in the machines for both applications.

If a wheel carrier configured as a gearbox housing is applied between the wheel and the chassis to the vehicle capable of operating on an incline as well as the vehicle not capable of such operation, then the wheel can be mounted at a greater distance from the chassis, which can increase its freedom of movement and the power can be transmitted in an optimum way.

Two shafts spaced at a distance from one another provide the input shaft and the output shaft and project from the wheel carrier and are directed parallel to each other; this makes it possible to utilize the space created by the moment arm between the shafts for a reduction gear.

If the axis of the output shaft of a power supply, that forms an input of the wheel carrier and the axis of a bearing that supports the pivot arm, are coaxial to each other, then the pivoting movement can be performed about the two shafts, without changing the relative position of these shafts; the spacing between the input shaft and the output shaft is maintained; these are concentric to the pivot axis of the wheel carrier.

The two legs of the pivot arm are connected with a positive lock which preferably can be disconnected easily, their entire configuration is easy to manufacture, since the one leg requires high strength and the other leg must have good bearing characteristics, which would be difficult to attain with a one-piece design consisting of the same material. The pivot arm can be designed for optimum strength if its legs are formed of the appropriate material for the particular loading and are then joined preferably by welding or other removable connecting methods. In this way it is possible, for example, to manufacture the one leg bolted to the wheel carrier from a high-strength forging, while the other leg, directed at right angles thereto, that can rotate in a bearing, is provided with a high surface hardness.

A stop is included on the pivot arm, in particular on its second leg, providing a safety feature since it can prevent the wheel carrier from reaching a position in which the vehicle could be damaged if the adjusting arrangement fails. This stop can make contact with the mount or at the support.

Optimization of the number of parts is achieved since the stop, which can be configured as a journal, simultaneously provides an attaching point for the actuating arrangement.

If a sensor is attached to the pivot arm in order to detect its position and generates an output signal therefrom, this can be used to control a sensor actuator which, in a combine, for example, can guide the crop recovery arrangement in a position parallel to the ground. The sensor actuator can operate hydraulically as well as mechanically or electrically. The hydraulic configuration is very useful here if high control forces must be transmitted.

The pivoting arrangement is of great advantage when it can be combined into a kit that makes it possible to retrofit a vehicle built for level operation into one that can operate on an incline.

A rapid retrofit without any problems is possible if the pivot arm and the mount are designed so that they can be fastened on the one hand to the flange on the support and on the other hand to the mating flange on the wheel carrier.

A line guide tube inserted into the mount, in particular welded in place, encloses hydraulic hoses for the control arrangement in its protective cover.

At least one spacer is inserted between the first leg and the bearing and may be located selectively between either the one or the other end face of the bearing configured as sleeve and the first leg, this makes it possible to retain the first leg permanently at various axial positions and thereby to vary the width of the track of the vehicle or the agricultural machine.

If the connecting means on the gearbox side, in particular in the pivot arm, that is, in its second leg, is provided with differing hole patterns, it is possible to attach various wheel carriers or the attachment of the same wheel carrier in various positions.

The chassis, that is a substructure, a frame, a machine housing, or the like, as well as the wheel and its wheel carrier remain the same in both designs; the two designs are distinguished only by the fact that in the one case a pivoting arrangement is present that can adjust the wheel in its height and that it is absent in the other case. For this purpose the pivoting arrangement is merely attached to the wheel carrier. The possibility of raising the vehicle with its chassis at one or both sides is appropriate not only for the operation on an incline; moreover this can also be advantageous during loading, for maintenance purposes, for operation across uneven ground or the like.

If the wheel is to be located at a greater distance from the chassis, if the region of the chassis in which the wheel is provided is inaccessible, or is not appropriate for the direct attachment of the wheel carrier, then it is appropriate to insert a support that makes the connection between the wheel carrier and the chassis.

A rapid modification to operation on an incline is assured if all possible and mating connections are provided with bolted flanges with the same hole pattern, or at least with a matching one.

There is an advantage in providing a support consisting of two parts, where the one, first part always remains with the chassis or is always ready for the connection with the chassis, and the second part can be exchanged with the pivoting arrangement. This last-named possibility leads to the fact that the overall width which can be very significant for the transport of the vehicle, always remain constant and can be held within the legal limits.

Depending on the question whether a certain vehicle width in the region of the wheels must be maintained or not, the chassis or the support can be fastened to the inner or the outer wall of a double-walled mount of the pivoting arrangement.

If a connection to the outer wall is intended the support can be incorporated into the pivoting arrangement through cutouts in the upper regions of the walls, so that the overall height does not change either.

The wheels may be driven in various ways, that is, a mechanical or hydrostatic drive may be connected to the wheels through a coaxial or an angled shaft, if necessary through an articulated shaft.

The drive may also be applied directly to an input shaft of the wheel carrier.

In place of separate connections to each wheel, a common connection may also be provided for the two wheels on one axle.

An agricultural machine can be applied to operation on level ground as well to operation on an incline, merely by an exchange of its supports, in particular, its axle. The modification is accomplished rapidly and easily and can be performed during manufacture as well as subsequently at a later time. The support could be prefabricated in the various versions, but with equal attachment dimensions to the chassis on the one hand and the wheel carrier on the other.

But the support itself is not changed to an extensive degree compared to a standard support, that is, one to which the wheel carrier is rigidly attached, if the pivoting arrangement contains all the components or those necessary for the vertical movement of the wheel carrier, and thereby this can also be attached as a unit by bolting or welding.

The mount can be designed with greater width without increasing the outside width of the agricultural machine noticeably or at all, if it is attached at least partly overlapping the side wall of the chassis.

Instead of a shaft from a mechanical gearbox, the drive to the wheel carrier can also be provided directly by a pressurized fluid motor, that can be protected even more if it is accommodated within the first leg.

The configuration of a two-stage or multi-stage pressurized fluid motor permits a large range of speeds.

If the pin supporting the control arrangement is configured as a sensing device, for example as a tension or compression pin, the resulting signals can be used to detect, for example, an overload condition or the weight increase resulting, for example, from the filling of the grain tank.

Minimal loading applied to the actuating arrangement in the non-operating condition is attained when the pistons are completely retracted into the cylinders and hence not subject to any pressure and a distinction is made between a rest condition and a full operating condition and where a control of the degree of pivoting of the wheel carrier is performed only in the full operating condition.

The actuating arrangements on each side, consisting of pistons and cylinder, can also be controlled manually to great advantage so that they extend fully and thereby raise the agricultural machine beyond the height used in normal operation. This increased height can be an advantage in loading, in maintenance work, during coupling and uncoupling of front attachments, and similar operations.

The wheel carrier can be attached to the second leg with particular rigidity if necked bolts are applied, which can be attained by providing, particularly by casting or forging, journals which are machined with stepped bores.

Optimum control of the agricultural machine encompassing all operating conditions is possible by the addition to the control device of the actuating arrangement or an attached control of the transverse inclination, of a transverse equalizing system for the front attachment that endeavors to guide the front attachment parallel to the ground at all times, independent of the inclination.

The advantage of the safety device lies in the fact that the load of the agricultural machine is not imposed on one actuating arrangement alone, if, for example, a hydraulic hose to the other actuating arrangement is damaged and the latter is no longer under pressure or that pressure cannot be maintained.

An indication of the transverse inclination of the agricultural machine can be established by a position sensor on the wheel carrier, the actuating arrangement, the pivot arm or similar components directly affected by the pivoting process or by means of a pendulum sensor, which is transmitted as a signal to an operator of the inclination of the agricultural machine, so that safety precautions can be taken, for example, during turning on an incline.

The support can be manufactured as an independent component and applied in various situations to agricultural machines already in service, so that a retrofit from the latest state of the art is available.

DETAILED DESCRIPTION

Figure 1:
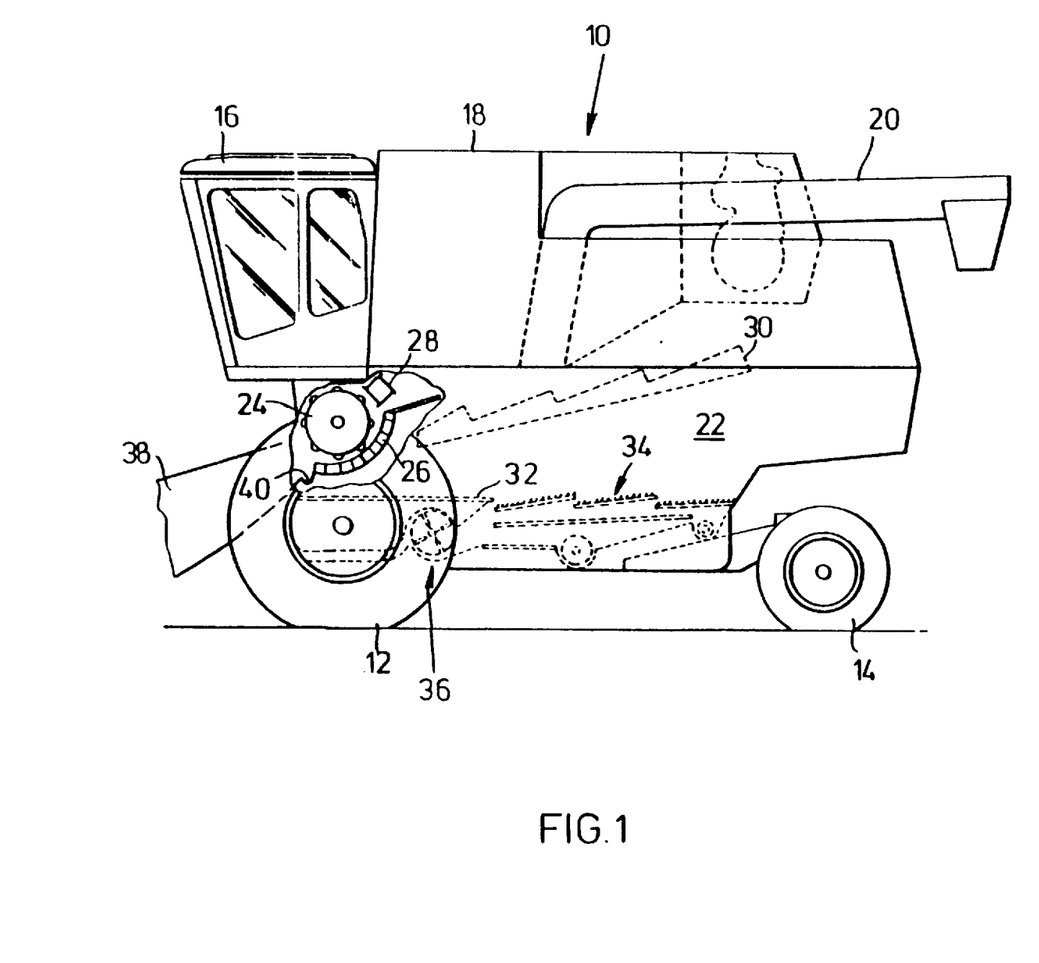
FIG. 1 shows a side view of a vehicle.
Figure 2:
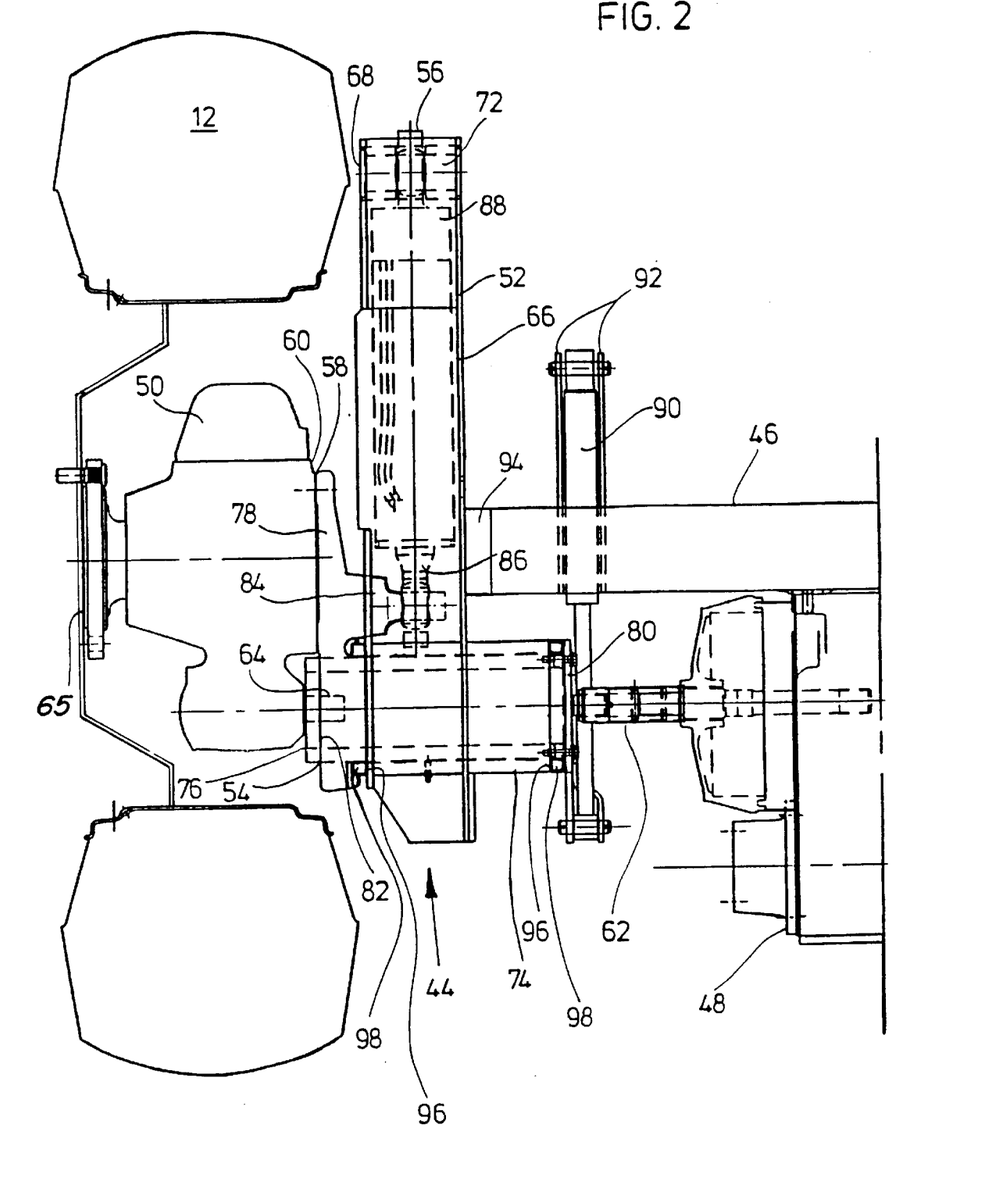
FIG. 2 shows a plan view of a support with a pivoting arrangement.
Figure 3:
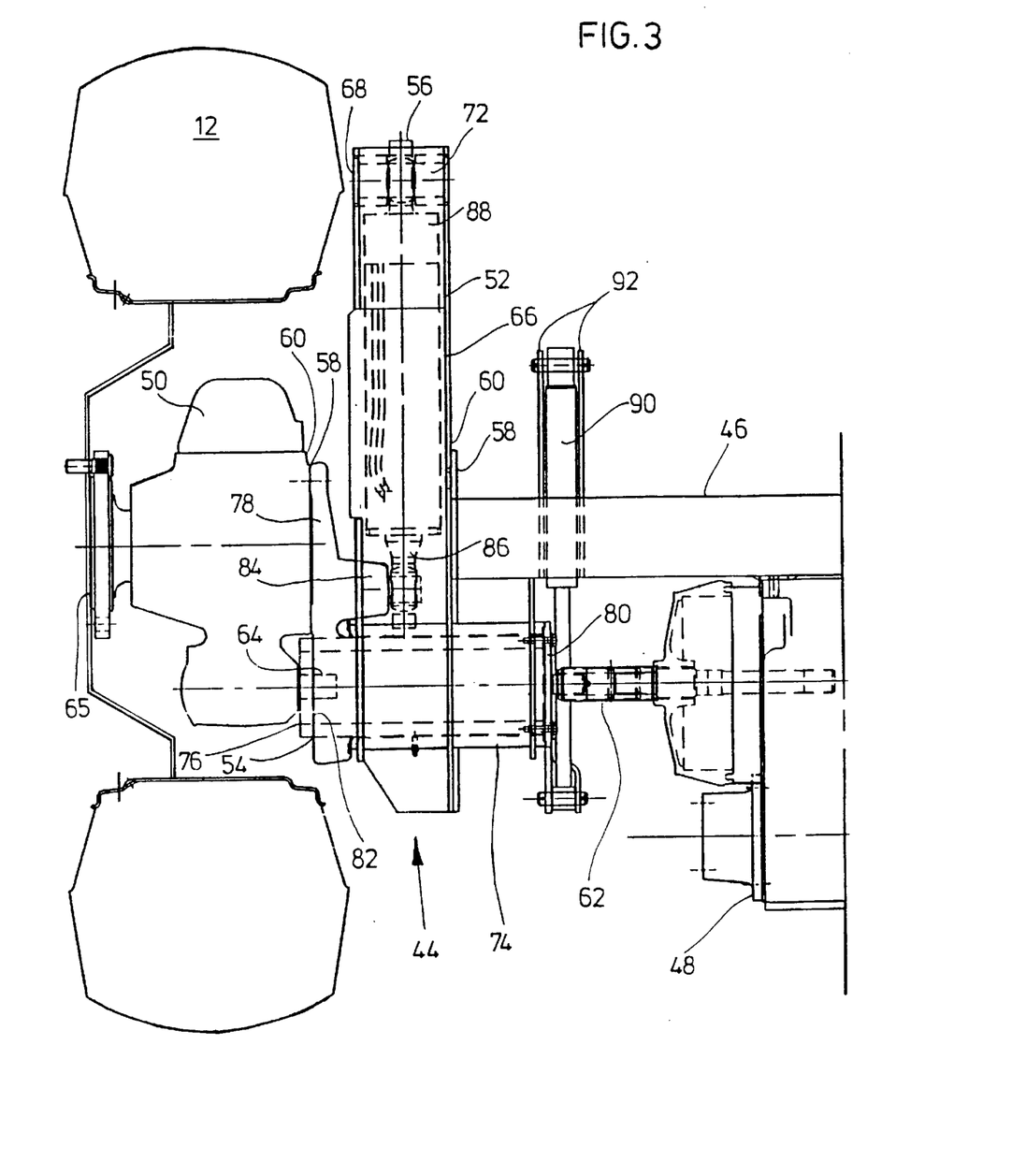
FIG. 3 shows a plan view of a support of a different design with a pivoting arrangement.

A vehicle 10 shown in FIG. 1, is an agricultural combine. It is supported on forward drive wheels 12 and rear steerable wheels 14, and includes an operator's cab 16 from which it can be controlled by an operator. In place of a combine, the invention can apply equally to every other type of agricultural, construction or logging machine or other vehicle in particular a grape harvester, a high-wheel agricultural tractor, a mowing machine, an off-the-road vehicle, a recreational vehicle, a forage harvester, a cotton picker, an agricultural tractor, an excavator, a feller buncher, a truck or the like. A grain tank 18 is located to the rear of the operator's cab 16. The grain tank can deliver crop deposited therein to the outside through an unloading pipe 20. The grain tank 18 is supported on a chassis 22. The front drive wheels 12 are attached to the chassis through a support 46 and a wheel carrier 50. The wheels 12 may also be attached directly to the chassis 22. In the chassis 22 a harvested crop supplied is first threshed by a threshing cylinder 24, a thresher concave 26 and a beater 28. Further separation of the threshed crop is performed on the straw walkers 30 as well as on a pan 32. The threshed and separated crop is then directed to sieves 34, where the clean grain is conveyed into the grain tank 18. The large components of the non-grain crop material is deposited on the ground over the straw walkers 30, and the light components are blown to the ground, from the sieves 34 by the blower 36. Crop harvested by a platform or header is directed to a feederhouse 38 which directs the harvested crop over a stone trap 40 to the threshing cylinder 24.

The shakers 30, the pan 32 and the sieves 34 are at their best when the vehicle 10 is positioned on a horizontal surface.

When operating on an incline, a pivoting arrangement 44 is provided, that retains the vehicle 10 within certain limits in a horizontal position.

For operation on level ground, the support 46 is rigidly attached to the wheel carrier 50, according to FIGS. 7 through 10. For permanent or intermittent operation of the vehicle 10 on inclines, the wheel carriers 50 are connected to the support 46, according to FIGS. 2 through 6, through the pivoting arrangement 44 so as to pivot vertically. In this way the vehicle 10 can be retained in a horizontal position within certain limits.

FIGS. 2 through 10 show various solutions for a support 46 with which vehicle 10 with the same chassis 22 can be equipped, some for application for operation on level ground and some for application for operation on an incline. For its connection to the chassis 22, the support 46 is provided with connecting means, not shown in detail, that may be configured as bolting, riveting or welding flanges.

The supports 46, shown in FIGS. 2 through 6, are equipped for operation on an incline and therefore include the pivoting arrangement 44.

The pivoting arrangement 44 establishes a connection between the support 46, a power supply 48 and the wheel carrier 50. In addition arrangement 44 contains a mount 52, a pivot arm 54 and an actuating arrangement 56. In vehicles 10 without the pivoting arrangement 44, the wheel carrier 50 is attached directly and rigidly to a flange, preferably so that it can be disassembled easily; this is illustrated in FIGS. 7 through 10.

The wheel 12 can be brought into rotation by the power supply 48, shown only schematically in the drawing and can be applied as forward as well as reverse. The wheel 12 is supported in bearing in the wheel carrier 50, free to rotate, from an output shaft 65 that blends into a wheel hub.

The pivoting arrangement 44 is designed so that it can be inserted between the wheel carrier 50 and the support 46 and thereby modifies the vehicle 10, arranged for operation on level terrain, into one adapted for operation on an incline. It should be noted that fundamentally it is sufficient that only one pivoting arrangement 44 is provided for one of the forward wheels 12. However, the degree of compensation for incline operation is increased if there is a pivoting arrangement 44 for each forward wheel 12. FIGS. 2 through 10 only show the left half of the support 46 as seen in the direction of travel, and the components attached to it, including the pivoting arrangement 44 for the left wheel 12.

In this embodiment, the support 46 is used and is configured as a single axle but this is not absolutely required. As long as a support 46 is necessary at all and the wheel carrier 50 is not directly attached to the chassis 22, one or several mounts or the like could nevertheless be provided as support 46, which are attached to the appropriate locations of the chassis 22, in particular, attached by flanges. The support 46 in this embodiment is configured as an axle tube with rectangular cross section and is attached to the chassis 22 by connecting means 94 on the side of the chassis. It extends in the lower region of the vehicle 10 transverse to its direction of travel and indirectly engages the forward wheels 12 in rotation. The connecting means 94 on the side of the chassis are shown schematically as flanges that are configured as bolting, riveting or welding flanges corresponding to the aforementioned flanges provided on the chassis 22. Preferably the support 46 is attached at its end faces rigidly to the mount 52 or alternatively through a flange extending vertically, not shown. If necessary a mating flange is attached to the mount 52. Preferably the connection can be made by welding.

The power supply 48 is a conventional multi-speed gearbox from which an output shaft 62 extends and which transmits the power to the forward wheels 12. This power supply 48 may also be provided by pressurized fluid motors.

The wheel carrier 50, configured as a gearbox housing and its enclosed more or less costly gear train, not shown, is usually designated as final drive and preferably contain a spur gear set that provides a rotational speed reduction between the power supply 48 and the forward wheel 12. For this purpose an input shaft 64 and an output shaft 65 are provided that mesh with each other through the spur gear set. On the other hand the use of a chain drive, a multi-speed gearbox or a planetary gearbox is possible. In any case the input shaft 64 extends parallel to the output shaft 65, so that the vertical position of the output shaft 65 changes when the wheel carriers 50 are rotated about the rotational axis of the input shaft 64. The input shaft 64 and the output shaft 62 are preferably coaxial. Depending on the gear set contained in the wheel carrier 50 and the strength considerations in the design of the wheel carrier 50 this may be variously configured and, if appropriate, be provided with various hole patterns for threaded holes, not shown. The threaded holes may be contained in a continuous flange as well as in separate journals, preferably provided with threaded holes for necked bolts. Such a flange, such journals or the like are generally designated as connecting means 60 which are equal in the wheel carriers 50 considered here and through which the wheel carrier 50 can be attached to the appropriate support 46.

As an alternative thereto the wheel carrier 50 could be configured in its simplest form as a bearing or a hub that supports the wheel itself, free to rotate, and connects it to its power supply 48.

The support 46, the power supply 48 and the wheel carrier 50 are components that are applied without any change to the vehicle 10 intended for operation on a level surface as well as that destined for operation on inclines. However in the case of the vehicle 10, intended exclusively for operation on inclines, the flange 58 on the support 46 can be omitted and the mount 52 can be welded or bolted directly to the support 46.

In this special embodiment the mount 52 is formed from thick-walled steel sheet forms a housing, partially open at the bottom, and extends generally parallel to the end face of the support 46 and preferably at least partially overlapping vertically a side wall of the chassis 22. An inner wall 66, located at the right in the drawing, an outer wall 68, a cover 70 and a bottom 71 should be noted.

The end face of the mount 52 is open and it is partially closed at the bottom 71.

The inner wall 66 is rigidly welded or bolted to the support 46 through plane surface or a flange. The flange 58 and the mating flange 60 in their simplest form may be configured as matching machined surfaces to which the support 46 and the mount 52 are connected to each other, for example, welded. In a further developed configuration the flange 58 and the mating flange 60 can be designed as flanges that are connected to each other by bolts or rivets.

In its simplest form, therefore, the mount 52 is welded to the support 46, while it may also be bolted or riveted by the use of flanges with holes. The connection by means of flanges need not be considered only in cases of a possible modification of the support 46 for operation on a level surface or on an incline, but may also be selected for reasons of manufacture.

The cover 70 and the bottom 71 connect both walls 66, 68 rigidly to each other and torsionally stiff, for example, by a welded connection.

The outer wall 68 extends parallel to the inner wall 66 and has the same shape or generally the same shape as the latter. A free space exists between the two walls 66, 68 in which the actuating arrangement 56 can move. Through the free space and perpendicular to the main extent of the walls 66, 68 a pin 72 extends in the forward region which engages and is secured in corresponding bores in the walls 66, 68. Through the opposing end regions there extends analogously a bearing 74 configured as a sleeve with a considerably larger diameter that, nevertheless, projects on each side of the walls 66, 68 and is welded to these, in order to produce a stable housing configuration. The bearing 74 extends concentric to the axis of rotation of the output shaft 62 and is provided with two end faces 96. In this embodiment the bearing 74 is located to the rear of the support 46 and at a small distance therefrom.

In summary, the mount 52 consists of a single weldment, that can be attached to the support 46 in place of the wheel carrier 50.

The pivot arm 54 consists of a first leg 76 and a second leg 78 that extend at right angles to each other in this embodiment and are connected to each other, fixed against rotation, in particular, welded. In a further developed embodiment the two legs 76, 78 can also be connected to each other with a threaded or a splined connection that is easily manufactured and easily separated. In this way each leg 76, 78 can be manufactured from appropriate material and by means of an appropriate process corresponding to the particular loading. For example, the first leg 76 can be turned and surface hardened in order to provide good bearing properties and the second leg 78 can be forged in a die as a flat part, resulting in high strength.

The first leg 76 is in the shape of a bushing that extends from the wheel carrier 50 to the output shaft 62 and includes an interior space through which a shaft extension can easily extend which is not shown and required only in an emergency, which connects the output shaft 62 with the input shaft 64. The outer surface of the first leg 76, whose outer surface is cylindrical, as well as the inner surface of the bearing 74 are surface hardened in order to achieve appropriate sliding and strength properties for operation as a sliding bearing. By the same token a separate sliding bushing can be provided between the first leg 76 and the bearing 74, and finally it is appropriate to attach a lubricating arrangement, but all of this is not shown. In place of the sliding bearing a needle bearing or a roller bearing could also be used. The first leg 76 is secured against axial movement to the outside, that is, to the left in the drawing, by means of a plate 80, that is attached to its end face. As already noted, in place of the connection with the power supply 48 through the output shaft 62, a pressurized fluid motor, not shown, could be provided within the first leg 76, which preferably produces two speed ranges and is applied directly to the input shaft 64.

In this embodiment two spacers 98 are provided for the axial positioning of the first leg 76 within the bearing 74; but fewer or more spacers 98 may be used. According to the embodiment of FIG. 2 a spacer 98 is located between the end face 96, at the left in the drawing, of the bearing 74 or the connecting point between both legs 76, 78 and an additional spacer 98 between the end face 96, at the left in the drawing, and the plate 80. In this way the second leg 78 and therewith the wheel carrier 50 can be brought closer to or further away from the mount 52 and thereby to the chassis 22, which opens the possibility of a change in the track width and the use of further tire sizes.

Figure 6:
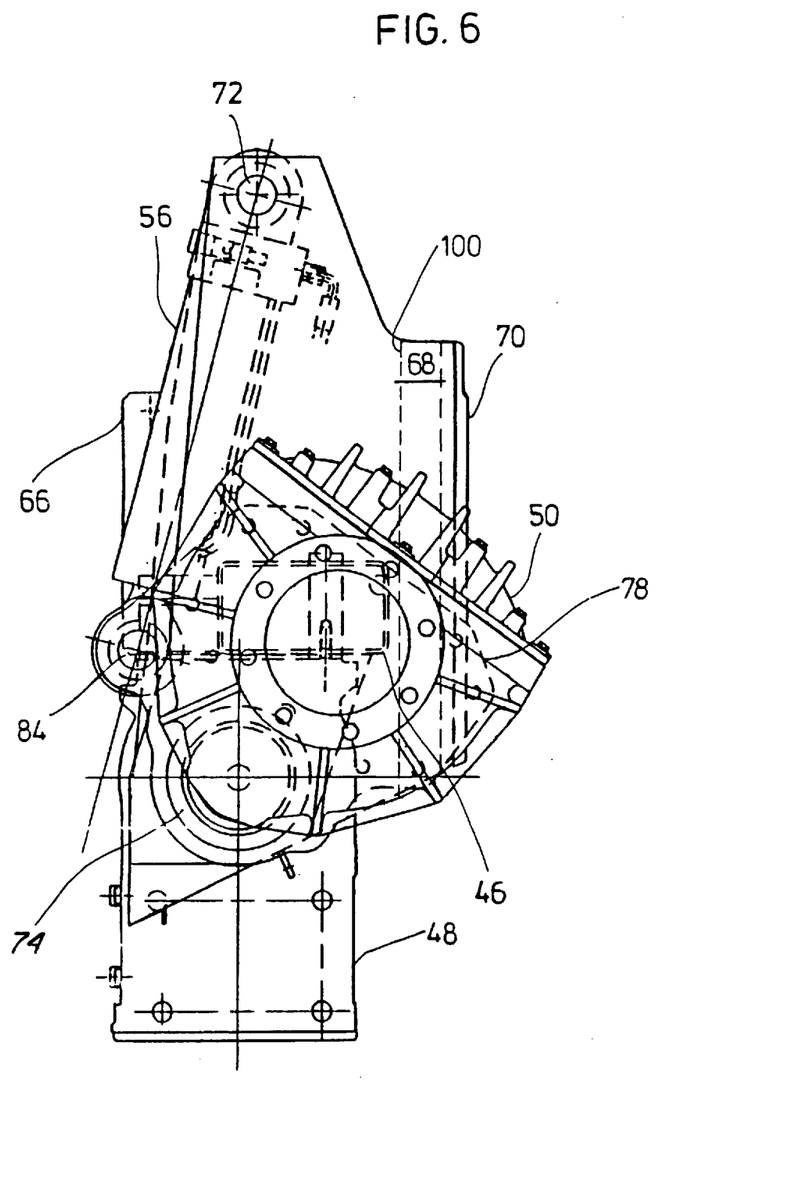
FIG. 6 shows a side view of the pivoting arrangement of FIGS. 2 through 5.

The second leg 78 is manufactured from a plate of a high strength casting or a forging which includes a connection 58 configured as a flange on the side of the wheel carrier in a forward end region, and a cylindrical opening 82 in another, rear region. The connecting means 58, attached on the outside of the wheel carrier, can form a connection with the connecting means 60, configured as a mating flange, at the wheel carrier 50 and is provided for this purpose with a corresponding hole pattern to permit the use of bolts. The second leg 78 can enclose the first leg 76 in the opening 82 almost without any clearance, so that both legs 76, 78 can be joined by a threaded or welded connection. Finally a stop 84 extends from the inner side of the second leg 78 parallel to the axis of the first leg 76, whose end is configured as a journal and that can be brought into contact with a lower edge of the outer wall 68, as can be seen in FIG. 6.

In an expanded further embodiment the stop 84, configured as a journal, as well as the pin 72 can be designed as sensors with load measuring devices or equipped with such devices that permit the determination of loads or the weight of the contents of the grain tank, although an evaluation arrangement is necessary for this purpose.

It can be seen, therefore, that the pivot arm 54 with the wheel carrier 50 can pivot about the rotational axis of the bearing 74 which is coaxial with the output shaft 62 in this embodiment without any loss in the coaxial relationship of the output shaft 62 and the input shaft 64.

In this embodiment the actuating arrangement 56 is configured as a double-acting linear hydraulic motor that encompasses a piston 86 and a cylinder 88 and is controlled by a control or regulating arrangement, not shown.

The cylinder end of the actuating arrangement 56 is supported in a pivot on the pin 72, its piston rod end is supported in a pivot on the stop 84 in its end region, configured as a journal. In the retracted position the stop 84 is in contact with the lower edge of the outer wall 68 and the actuating arrangement 56 extends partially downward out of the mount 52. In an extended position of the actuating arrangement 56, the actuating arrangement 56 as well as the wheel carrier 50 move downward out of the mount 52 or beyond it. As a result of the actuation of the actuating arrangement 56 the wheel carrier 50 is therefore pivoted with the pivot arm 54 in the bearing 74.

As can be seen from FIG. 6 the wheel carrier 50 pivots in counterclockwise direction about the longitudinal centerline of the bearing 74 as soon as the actuating arrangement 56 is extended. This pivoting movement has the effect that the distance between the support 46 and the contact surface of the wheel 12 changes and the chassis 22, that is, the entire vehicle is raised, at least on one side.

The actuating arrangement 56 is activated by a hydraulic circuit, not shown, in which a source of pressure and at least one multi-way positioning valve are provided. The multi-way positioning valve is preferably operated by electromagnets that receive their control signals from a control circuit. The control circuit contains a known pendulum sensor or mercury level which detect a sideways inclination of the vehicle 10 and generates an output signal therefrom that has the object of holding the vehicle 10 in a horizontal position by retracting or extending the actuating arrangement 56.

A line guide tube 100 is welded into the mount 52 through which hydraulic hoses, not shown in any further detail, are routed to the actuating arrangement 56, so that they are not exposed to any mechanical loading and are thereby protected. The line guide tube 100 is not shown in FIGS. 2 through 5, for the sake of clarity.

The control circuit may also be controlled and overridden by a manually operated switch, that can initiate an operating and a non-operating condition. In the operating condition a distinction is made between a rest operating condition and a full operating condition. In the rest condition the two actuating arrangements 56 are each extended half way, so that the vehicle 10 is raised in its forward region and assumes the proper position with respect to the ground. The actuating arrangements 56 remain in this position. In the full operating condition the two actuating arrangements 56 can alternately be fully extended or fully retracted, in order to raise or lower the vehicle 10 on the left or the right side.

Beyond that it is possible to arrange a further switch in the non-operating condition with which both actuating arrangements 56 can be manually extended fully, which may be useful in the loading of the vehicle 10 at a low loading platform, for maintenance operations or for the mounting or removal of certain front attachments.

The pivoting arrangement 44 is developed further in this embodiment in such a way that a signal can also be generated for the movement of a further component by means of the path of motion of the pivot arm 54 or the wheel carrier 50, which is to be brought into a position that also depends on the inclination. In combines, for example, the mower head, which pivots along with the chassis 22 when this is pivoted into the horizontal, must be brought into a position parallel to the ground or retained in such a position. For this purpose a sensor actuator 90 is provided that is also configured as a double-acting linear hydraulic motor. One end of this sensor actuator 90, the cylinder end, is connected, free to pivot, through brackets 92 to the support 46 and the other end, the piston rod end, is connected, free to pivot, eccentrically to the plate 80. Lines, not shown in the drawing, connect the appropriate pressure chambers of this sensor actuator 90 with those of a sensor, that engages the other pivoting components, such as the mower head. As can be seen, as a result of a pivoting motion of the pivot arm 54 through the first leg 76 and the plate 80, the sensor actuator 90 is changed in its length, so that pressurized fluid is forced out of it and through the lines to the sensor.

The connecting point of the sensor actuator 90 at the plate 80 and the position of the actuating arrangement 56 with respect to the stop 84 and the pin 72 can be changed by the use of the spacers 98 and the axial position of the first leg 76 in the sleeve 74 is varied.

The hydraulic circuit of the sensor actuator 90 and the sensor can also accommodate the integration of a mower head height control with transverse equalization which guides a second front attachment of the vehicle configured as an agricultural machine and constantly holds it parallel to the ground, in order to equalize the deviation from the parallel due to a sunken wheel, a furrow or a tire deflection during the operation on the incline. This mower head height control could equally well operate directly on the actuating arrangements 56.

Such a sensor can also operate on other components that must be controlled in relation to the inclination, such as guide vanes on the sieves, or the preparation chute, or the position of the sieve box.

If the initial intention is to equip the vehicle 10 exclusively for operation on inclines, the pivoting arrangement 44 is attached through the mount 52 directly to the support 46 by welding as previously described, resulting in an axle consisting of a uniform weldment, which can be attached by the connecting means 94 on the side of the chassis to the corresponding connecting means on the chassis 22.

On the other hand, the vehicle 10 may also be intended as a machine operating principally on a level surface, in which the wheel carrier 50 is rigidly attached directly with its connecting means 60, configured as a flange, to the support 46. In this case the support 46 is so configured that all parts connected to the pivot arrangement 44 are omitted. Such a support 46, configured as an axle, is shown in FIGS. 7 through 10 and includes a support 46 that is longer by the width of the pivoting arrangement 44 compared to the support 46 with the pivot arrangement 44, where according to FIGS. 8 and 10 the support 46 is a two-piece configuration and the length corresponding to the pivot arrangement 44 is bridged by an intermediate part 102.

Figure 7:
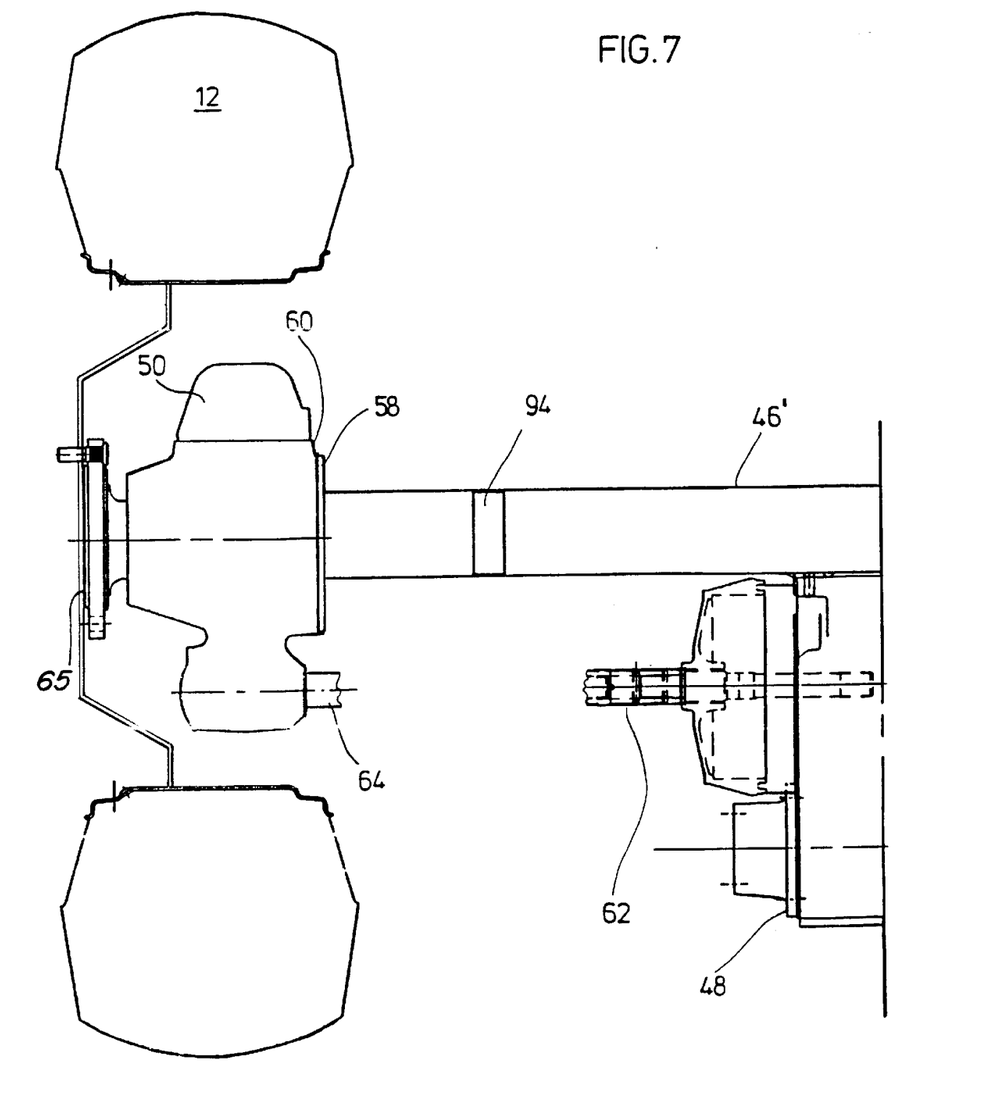
FIG. 7 shows a plan view of a support without pivoting arrangement.
Figure 8:
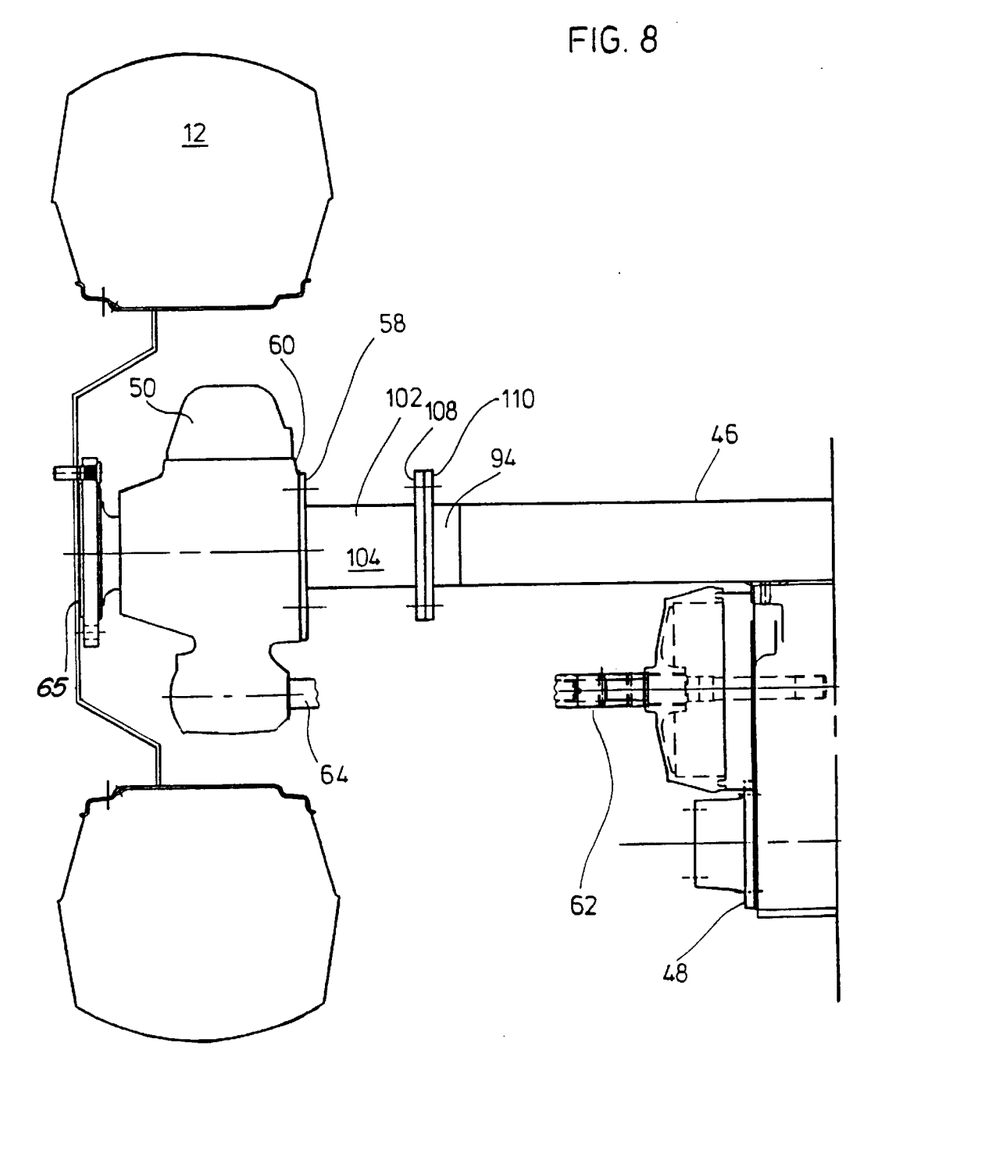
FIG. 8 shows a plan view of a support without a pivoting arrangement but with an intermediate part.
Figure 9:
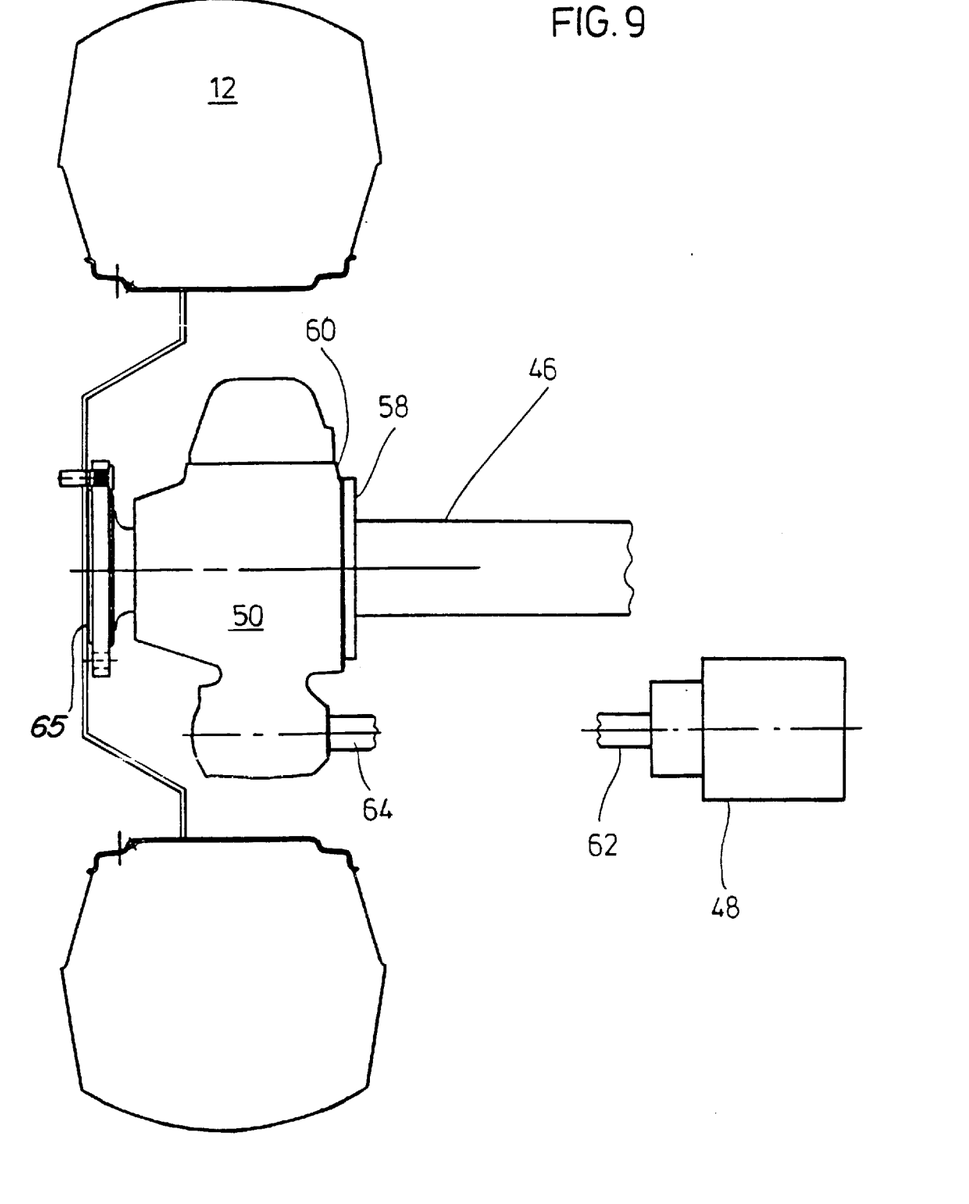
FIG. 9 shows a plan view of a support without a pivoting arrangement.
Figure 10:
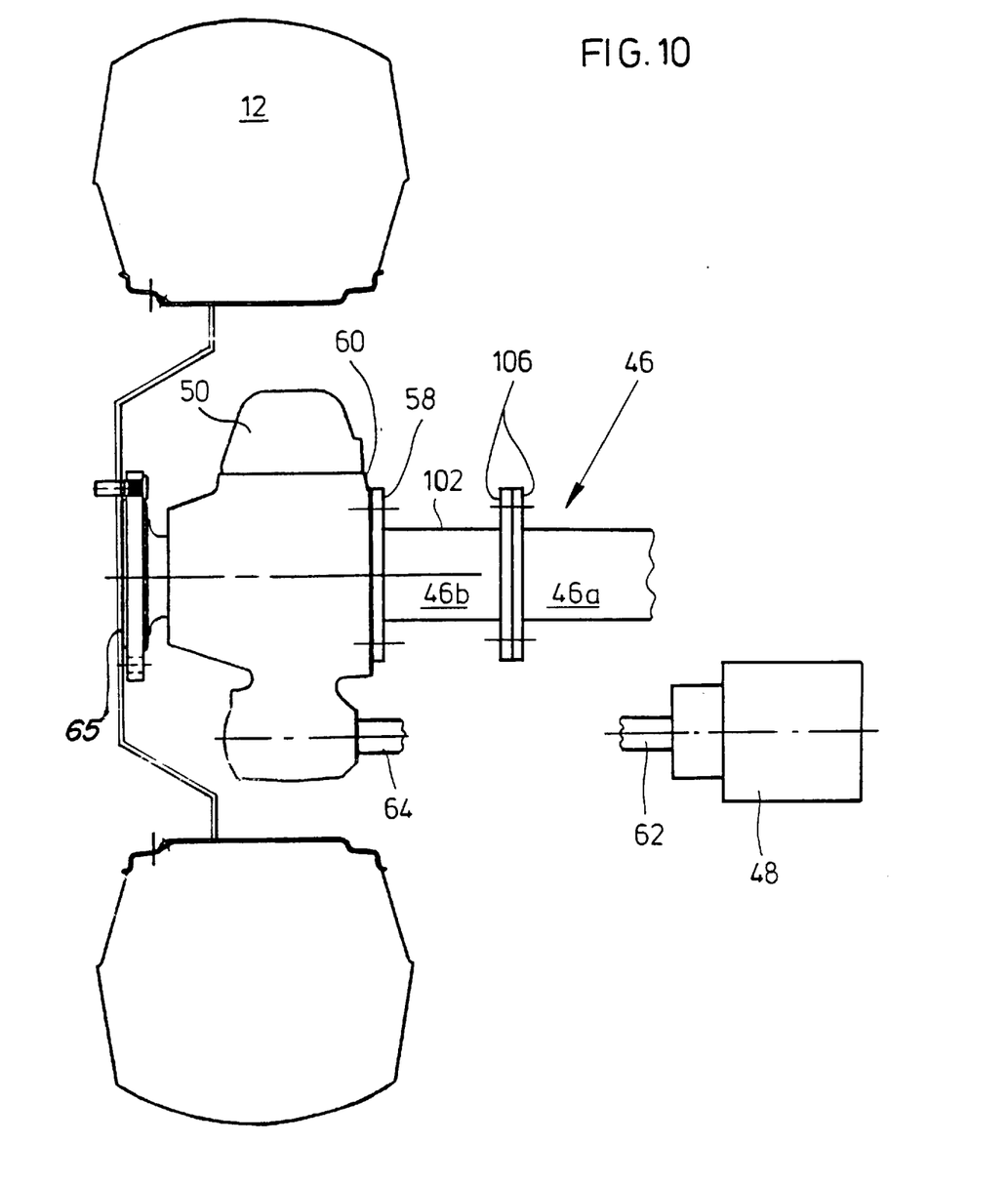
FIG. 10 shows a plan view of a support without a pivoting arrangement but with an intermediate part.

Correspondingly FIGS. 8 and 10 show a support 46 that corresponds generally to that shown in FIGS. 7 and 9, but which is attached through an intermediate part 102 to the wheel carrier 50. This intermediate part 102 corresponds to the distance from the end of the support 46 to the connecting means 60 on the wheel carrier 50, when the pivot arrangement 44 is used. The intermediate part 102 is composed of a tubular component 104, the connecting means 58 on the side of the wheel carrier configured as a plate and a plate 108 that also represents a connecting means, where the connecting means 58 on the side of the wheel carrier 50 is bolted to the connecting means 60 of the wheel carrier 50 and the plate 108 is bolted to a flange 110 also configured as a connecting means on the outer side of the support 46. In this way the same support 46 is used for the support 46 configured as axle for application in operation on the level and for that in the operation on inclines, where the gap is bridged selectively by the pivot arrangement 44 or the intermediate part 102. The mount 52 and the intermediate part 102 may in each case be bolted, riveted or welded to the support 46.

The support 46 shown in FIGS. 4, 5, 9 and 10 represents an alternative form of the indirect connection of the wheel carrier 50 to the chassis 22 that contrasts to the support 46 described above. The wheel carrier 50 could equally well be attached directly to the chassis 22, if this is provided with corresponding connecting means.

In this case the support 46 is configured as an axle component; but it may also be configured as a simple strut, and angle iron, a platform or a similar connecting element. Each wheel 12 may be provided with its own support 46; but several supports 46 may be combined to a common support, chassis, axle or the like.

In the alternative embodiment according to the FIGS. 4, 5, 9 and 10 the power supply 48 is not connected at a flange to the chassis 22, but it is indicated that the power supply 48 can be located at any position on the vehicle 10 and can be configured in a multiplicity of ways, in particular as a mechanical or hydrostatic drive, provided with an output shaft 62 that is rigidly connected to the input shaft 64, fixed against rotation. The power supply 48 can also be arranged so that the output shaft and the input shaft 62, 64 are not coaxial to each other, as shown, but are offset; in this case an articulated shaft would be used to transmit the drive power. Finally the power supply 48 could be directly connected to a flange at the wheel carrier 50 and to the input shaft 64 in order to supply the drive through a coupling sleeve or other type of coupling. Every sort of connection between the output shaft and the input shaft 62, 64 can be completely rigid and fixed against rotation but may also include torsional dampers.

In the embodiment shown in FIG. 9 the wheel carrier 50 can be easily disassembled from the connecting means 58 on the side of the wheel carrier and the mating flange provided as its connecting means 60. The bolts used for this connection are not shown.

Figure 4:
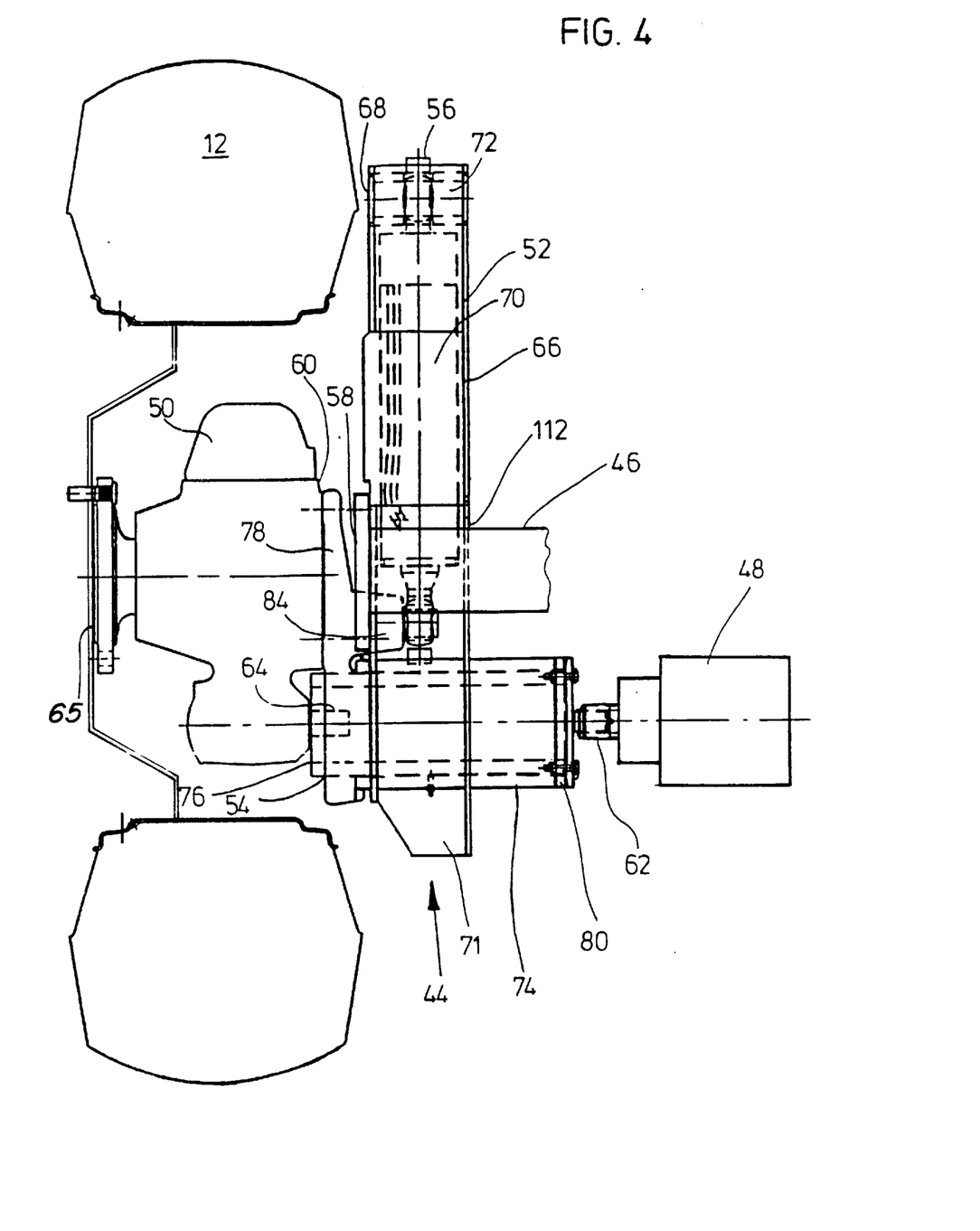
FIG. 4 shows a plan view of a support with a modified pivoting arrangement.

According to FIG. 4 the pivoting arrangement 44 is so designed that it can be connected to a vehicle 10 with a support 46 according to FIG. 9 in order to modify this vehicle 10 to operate on inclines.

On the side towards the viewer in FIG. 4 and the upper side of the mount 52 each wall 66, 68 is provided with a cutout 112 whose cross section is sufficiently large to enclose the support 46. It is also possible to locate the support 46 directly on the upper side of the mount 52 and to connect it so that it can be easily disassembled. In the embodiment according to FIG. 4 the support 46 is connected to the mount 52 in such a way that the connecting means 58 on the side of the wheel carrier is in contact with the outer side of the outer wall 68 and is connected to it with the aforementioned bolts. Therefore the extent of the support 46 in the direction of the rotational axis of the wheel 12 remains up to here the same as with a rigidly connected wheel carrier 50.

FIG. 10 shows a support 46 that essentially corresponds to that in FIG. 9. The difference lies in the fact that according to FIG. 9 the support 46 is in a one-piece configuration and reaches directly to the wheel carrier 50, while in FIG. 10 it consists of a first and a second part 46a and 46b, where the first part 46a is connected to the chassis 22 and carries a flange 58 on the side of the wheel carrier. The second part 46b is configured as an intermediate part 102 that is provided at both ends with a connecting means/flange 58 and is bolted with this to the connecting means/mating flange 60 of the wheel carrier 50 and to the connecting means 58 of the first part 46a. The cross section of the intermediate part 102 can correspond to that of the first part 46a, its length corresponds preferably at least to the width of the mount 52, that is, its extent in the direction of the rotational axis of the wheel 12. On occasion it is advantageous to make the intermediate part 102 longer than the width of the mount, which is explained in greater detail in connection with FIG. 5.

Figure 5:
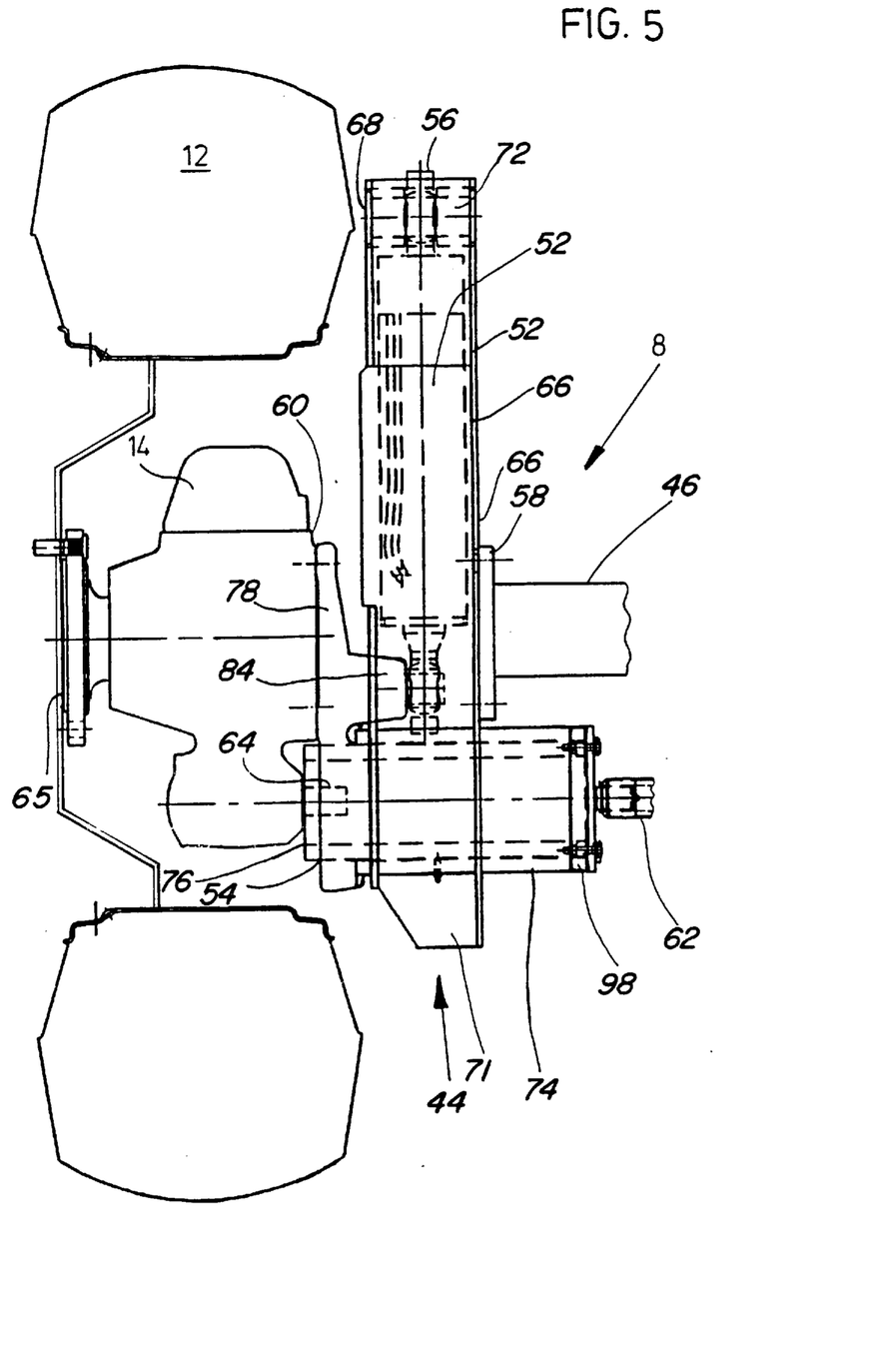
FIG. 5 shows a plan view of a support with a pivoting arrangement attached by a different method.

FIG. 5 shows a pivoting arrangement 44 that corresponds to that of FIG. 4 except for the cutouts 112, the latter are omitted in this embodiment. According to FIG. 5 the mount 52 of the pivoting arrangement 44 is bolted with its inner wall 66 to the connecting means 58 on the wheel carrier side of the first part 46a of the support 46 in place of the intermediate part 102. Otherwise the embodiment according to FIG. 4 has the same development possibilities.

As noted above the intermediate part 102 may also be longer than the width of the mount 52. In particular the intermediate part 102 including its connecting means/ flanges 58 may be so long as long as the distance between the attaching surface of the second leg 78 on the wheel carrier 50 and the connecting surface of the inner wall 66 at the connecting means 58 on the side of the wheel carrier of the first part 46a of the support 46, so that in an exchange of the intermediate part 102 for the pivoting arrangement 44 or the reverse, the relative position of the wheel 12 to the chassis 22 and therewith the overall width does not change at all.

On the basis of the forgoing description the modification of a vehicle 10 intended for operation on level ground to one suitable for operation on inclines will include the following process, where initially the wheel 12 is directly attached to the chassis 22 by means of the wheel carrier 50.

The steps in this process consists of the following:

a) The wheel carrier 50 is separated from the chassis 22 and b) the pivoting arrangement 44 is inserted between the wheel carrier 50 and the chassis 22 and encloses and supports the wheel carrier 50 eccentrically and able to pivot vertically.

If a chassis 22 is provided to which the wheel 12 is attached through the wheel carrier 50 and a support 46, then the process is characterized by the following steps:

a) The wheel carrier 50 is separated from the support 46, b) if necessary the support 46 is shortened by the width of the pivoting arrangement 44 and c) the pivoting arrangement 44 is inserted between the wheel carrier 50 and the support 46 and encloses and supports the wheel carrier 50 eccentrically and able to pivot vertically.

The last named process can be performed more easily if the shortening of the support 46 is accomplished by the removal of the intermediate part 102 of the support 46.

The vehicle 10 can therefore be easily modified, even after its completion, into a vehicle 10 capable of operating on inclines by the use of the appropriate combination of support 46, pivoting arrangement 44 and the intermediate part 102 if required.

The vehicle 10 can therefore be modified easily and after completion into a vehicle 10 capable of operating on inclines by separating the wheel carrier 50 from the support 46 or its intermediate part 102, if they are present, by inserting the mount 52 in between, bolting the wheel carrier 50 to the pivot arm 54 and inserting it into the mount 52, connecting the actuating arrangement 56 and connecting the power supply 48 to the input shaft 64, if necessary through a shaft extension or an articulated shaft, fixed against rotation, whereby the latter can be omitted if the power supply 48 is connected directly to the input shaft 64. For this purpose a kit for the modification of the vehicle 10 contains the mount 52, the pivot arm 54, the actuating arrangement 56 and, if necessary, a shaft coupling.

We claim:

1. An agricultural machine having a hillside leveling system, comprising:

a chassis (22);

a power supply (48) mounted to the chassis (22), the power supply (48) having a drive shaft (62);

a wheel carrier (50) having an input shaft (64) and an output shaft (65) defining parallel axes that are offset with respect to one another, the output shaft (65) is coupled to a drive wheel (12) and the input shaft (64) is coupled to the power supply (48);

a pivoting arrangement (44) couples the wheel carrier (50) to the chassis (22), the pivoting arrangement allows the wheel carrier (50) to move vertically relative to the chassis (22), the pivoting arrangement (44) is provided with a pivot arm (54), the pivot arm (54) is provided with a first leg (76) which is pivotally connected to the chassis (22), the first leg (76) forms a bushing through which the input shaft (64) of the wheel carrier (50) passes, the pivot arm (54) is also provided with a second leg (78) which extends between the first leg (76) and the wheel carrier (50);

an actuating arrangement (56) is located between the pivoting arrangement (44) and the chassis (22) for moving the wheel carrier (50) vertically relative to the chassis (22);

wherein the input shaft (64) and the drive shaft (62) are coaxial and define a pivot axis about which the wheel carrier (50) is pivoted for moving the wheel carrier (50) vertically relative to the chassis (22).

2. An agricultural machine as defined by claim 1 wherein the first leg (76) is rotatably mounted in a bracket (52) connected to the chassis (22) and the second leg (78) forms a flange mounted to the wheel carrier (50).

3. An agricultural machine as defined by claim 1 wherein the bracket (52) has a first end forming a bearing (74) in the shape of a cylindrical sleeve for receiving the first leg (76), the bracket (52) has a second end forming a bearing for receiving a pin (72) for retaining the actuating arrangement (54).

4. An agricultural machine as defined by claim 3 wherein a bushing is located between the first leg (76) and the bracket (52).

5. An agricultural machine as defined by claim 3 wherein the actuating arrangement (54) comprises a hydraulic cylinder and the bracket (52) comprises two walls (66, 68) extending parallel to one another which receive the hydraulic cylinder therebetween.

6. An agricultural machine as defined by claim 5 further comprising a sensor actuator (90) for detecting the position of the pivot arm, the sensor actuator (90) extends between the first leg (76) and the chassis (22).

7. An agricultural machine having a hillside leveling system, comprising:

a chassis (22);

a power supply (48) mounted to the chassis (22), the power supply (48) having a drive shaft (62);

a wheel carrier (50) having an input shaft (64) and an output shaft (65) defining parallel axes that are offset with respect to one another, the output shaft (65) is coupled to a drive wheel (12) and the input shaft (64) is coupled to the power supply (48);

a pivoting arrangement (44) couples the wheel carrier (50) to the chassis (22), the pivoting arrangement allows the wheel carrier (50) to move vertically relative to the chassis (22), the pivoting arrangement (44) is provided with a pivot arm (54) and a bracket (52), the pivot arm (54) is provided with a first leg (76) which is pivotally connected to the chassis (22), the first leg (76) forms a bushing through which is aligned with the input shaft (64) of the wheel carrier (50), the pivot arm (54) is also provided with a second leg (78) which extends between the first leg (76) and the wheel carrier (50), the bracket (52) is provided with two walls (66,68) which are spaced from one another, the bracket has a first end carrying a pin (72) and a second end carrying a bearing (74);

an actuating arrangement (56) is located between the pivot arm (54) and the chassis (22) for moving the wheel carrier (50) vertically relative to the chassis (22), the actuating arrangement (56) comprising a hydraulic cylinder located between the walls of the bracket (52), the hydraulic cylinder is mounted to the pin (72) and the second leg (78) of the pivot arm (54) such that the hydraulic cylinder extends more horizontally than vertically.

\* \* \* \* \*